Feb. 28, 1928.
H. A. FITZJOHN
1,660,377
MOTOR BUS
Filed June 10, 1925　　2 Sheets-Sheet 1
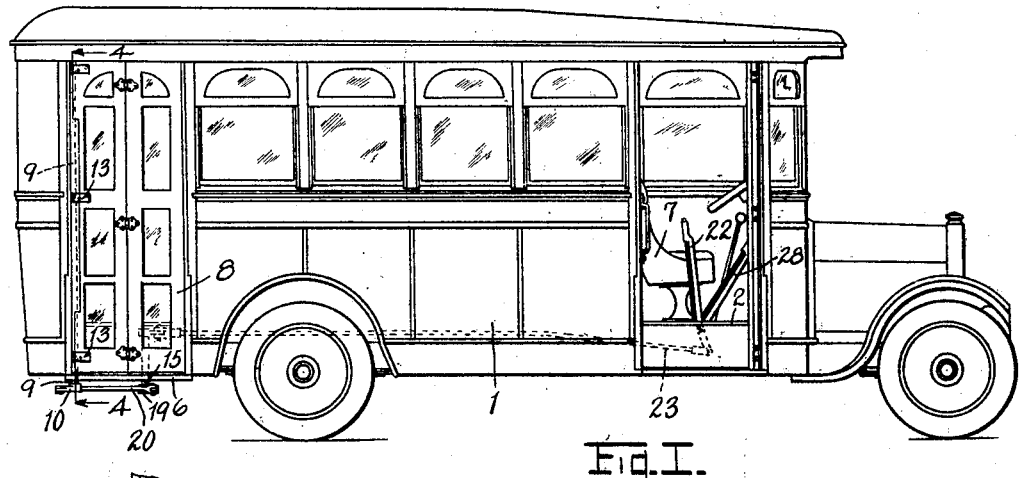
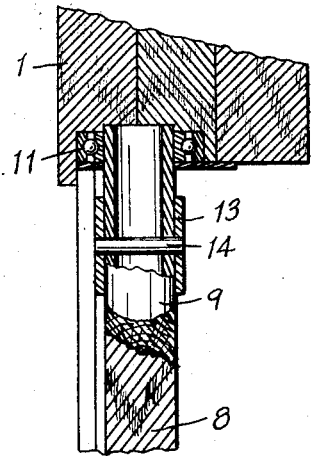
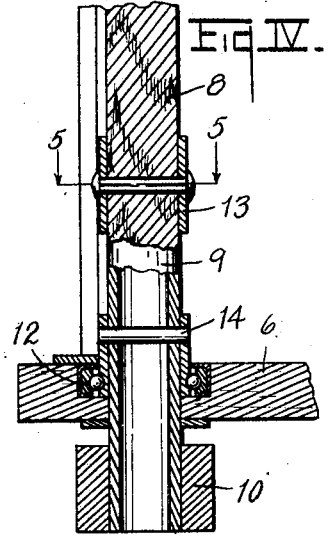
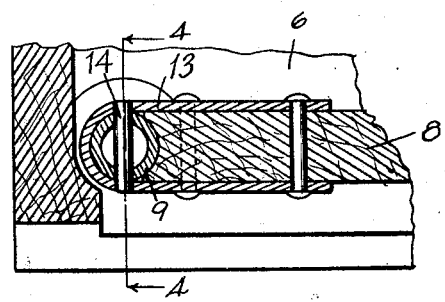
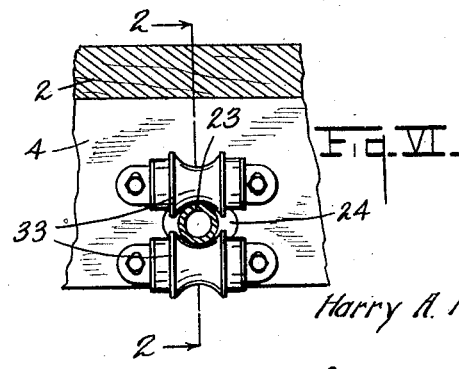
Inventor
Harry A. Fitzjohn
By Chappell Earl
Attorneys

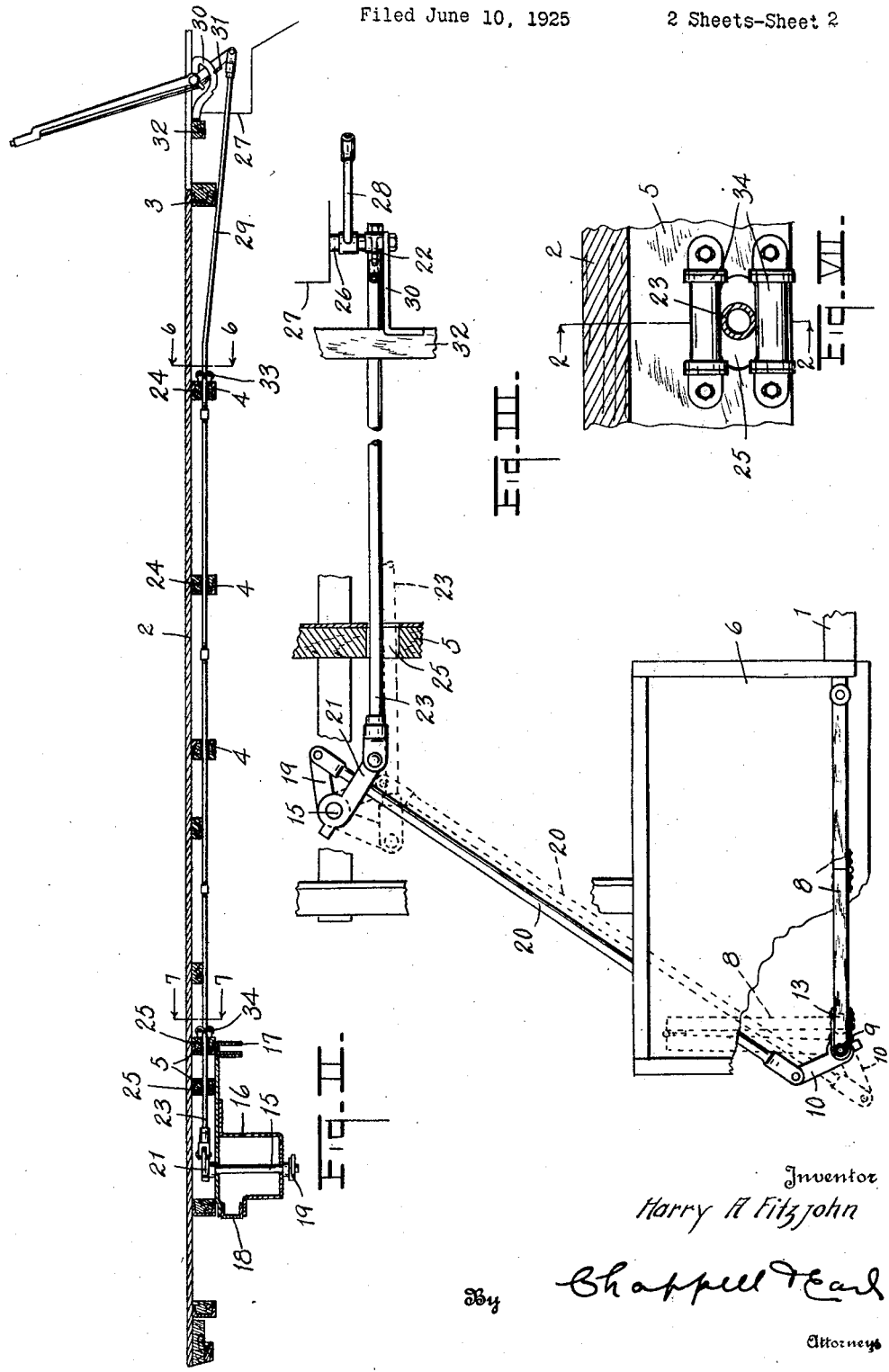

Patented Feb. 28, 1928.

1,660,377

UNITED STATES PATENT OFFICE.

HARRY A. FITZJOHN, OF MUSKEGON, MICHIGAN, ASSIGNOR TO FITZJOHN MANUFACTURING COMPANY, OF MUSKEGON, MICHIGAN.

MOTOR BUS.

Application filed June 10, 1925. Serial No. 36,126.

This invention relates to improvements in motor busses.

The main object of this invention is to provide a motor bus or motor passenger vehicle with a rear door which may be opened for exit or emergency purposes and with improved means for operating the same from the front of the vehicle.

A further object is to provide an improved door operating means for motor vehicles in which the operating connections from the front of the vehicle are so disposed as to be effectively protected from injury on account of springing of the vehicle and are not likely to become inoperative in case of accidents.

A still further object is to provide an improved door operating means in which the operating lever is conveniently positioned relative to the driver's seat and one in which the operating lever is not likely to be confused with other operating levers of the vehicle.

Objects pertaining to details and economies of construction and operation of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a side view of a motor bus embodying the features of my invention, the front door being open.

Fig. II is a detail central longitudinal section showing portions of the floor and cross sills of the body of my improved vehicle and two of the chassis cross members, with certain of the door operating parts, the part sectioned being on a line corresponding to line 2—2 of Fig. IV and parts of the transmission casing being conventionally shown.

Fig. III is a fragmentary view partially in horizontal section showing further details of the door operating connections, the transmission casing being conventionally shown.

Fig. IV is a detail view partially in vertical section on a line corresponding to line 4—4 of Figs. I and V, showing details of the rear door mounting.

Fig. V is a detail horizontal section on a line corresponding to line 5—5 of Fig. IV.

Fig. VI is a fragmentary view in section on a line corresponding to line 6—6 of Fig. II showing details of the support for the door operating rod.

Fig. VII is a fragmentary view in section on a line corresponding to line 7—7 of Fig. II showing further details of the support for the door operating rod.

In the drawing the sectional views are taken looking in the direction of the little arrows at the ends of the section lines and similar numerals of reference indicate similar parts throughout the several views.

I have illustrated my improvements in a motor bus in one form in which I have embodied the same commercially. The body designated generally by the numeral 1 is provided with a floor 2 having a plurality of cross sills 3, 4 and 5. These sills are substantially the same in structure, being made up of wood and channel iron as illustrated, different reference numerals being used for convenience in defining their relation to other coacting parts.

The body is provided with a rear door platform 6 disposed in a plane below the plane of the floor 2. The driver's seat 7 is arranged at the front of the vehicle and at the left side of the longitudinal center of the vehicle. The door 8 is of the collapsible section type and is supported on the vertical shaft 9, the lower end of which projects through the platform 6 and is provided with an arm 10. This shaft is supported at its upper and adjacent its lower end by roller bearings 11 and 12 respectively.

The door is secured to the shaft by the U-shaped straps 13 which embrace the rear edge of the door and the shaft, pins 14 being arranged through these straps. An upright rockshaft 15 is mounted on the hanger 16, the hanger being mounted on the chassis cross members 17 and 18. On the lower end of this rockshaft is an arm 19 which is connected to the arm 10 on the door operating shaft by means of the link, 20. The upper end of the rock shaft projects between a pair of the cross sills of the body and is provided with an arm 21. This arm is connected to the operating lever 22 by means of the operating rod 23.

This operating rod is arranged through holes 24 in the body cross members 4 and elongated holes 25 in the body cross sills 5 which are adjacent the rock shaft, the holes being elongated so as to permit lateral swinging of the operating rod as shown by dotted lines in Fig. III.

The lever 24 is mounted on a stud 26 carried by the transmission housing 27. This stud also serves as a support for the brake lever 28. The connections for this lever to the brake are not illustrated as they form no part of this invention. However, the levers are mounted on the same stud for a definite purpose and in a definite relation, the object being to prevent confusion and at the same time locate the levers so that they are conveniently operated by the driver occupying the seat 27.

The lower end of the lever 22 projects below its pivot and the connecting rod is bent downwardly at 29 to pass under the cross sill 3 of the body and connect with the lower end of the lever. A segment 30 is provided for the detent 31 of the lever, the segment being connected to the stud and to a cross member 32 on the body so that this segment serves as a brace for the outer end of the pivot stud 26.

As is the usual practice, the brake lever 28 is in its off position when swung forwardly as shown in Fig. I. The lever 22 when the door is closed is in the opposite position as shown in this figure so that the operator is not likely to grasp the door operating lever when he desires to operate the brake, the levers normally occupying the opposed relation shown.

To reduce friction on the operating rod the front cross sill 4 has a pair of supporting rollers 33 mounted thereon, these rollers being grooved to support the rod against lateral movement. I also provide a pair of supporting rollers 34 which are mounted on one of the cross sills 5, preferably the front one as illustrated, these rollers being spool-like in form allowing for the lateral swinging of the rear end of the rod occasioned by its connection to the arm 21.

My improved door operating means is so arranged that it is not likely to be injured by accident, the connecting or operating rod being also supported so that it does not vibrate and it cannot be injured by the movement of the body on its springs. While my improvements are especially designed for operating a rear side exit door for motor busses, they are readily adapted for emergency doors sometimes located in the rear end wall of the vehicle.

Having thus described my invention what I claim as new and desire to secure by Letters Patent is:

1. In a motor vehicle, the combination of a chassis provided with cross members adjacent its rear end, a passenger body mounted on said chassis and having a driver's seat disposed at the front thereof and at the left of its longitudinal center, said body having a rear side door platform disposed in a plane below the plane of said chassis cross members, said body having cross sills, a rear door, an operating shaft therefor disposed vertically to project below said door platform and having an arm on its projecting end, a rock shaft hanger mounted centrally on said chassis cross members, a vertically disposed rock shaft mounted on said hanger and provided with arms on its upper and lower ends, a link connecting the arm on the lower end of said rock shaft to said arm on said door shaft, a door operating lever disposed centrally of said vehicle at the right side of said driver's seat with the lower end of the lever projecting below the plane of said body cross sills, a door operating rod having a downwardly bent front end disposed below the cross sill immediately at the rear of said door operating lever and connected to the lower end of said lever, there being a plurality of the body sills between said rock shaft and door operating lever having openings therein in which said operating rod is reciprocatingly supported, the openings in said sills adjacent said rock shaft being horizontally elongated to permit limited lateral movement of the rod, a pair of grooved supporting rollers for said actuating rod mounted on the front sill through which the rod is arranged, and a second pair of spool-like supporting rollers mounted on one of the rear sills having the elongated opening therein too support said rod and permit limited lateral swinging of the rear end thereof.

2. In a motor vehicle, the combination of a chassis provided with cross members adjacent its rear end, a passenger body mounted on said chassis and having a driver's seat disposed at the front thereof and at the left of its longitudinal center, said body having a rear side door platform disposed in a plane below the plane of said chassis cross members, said body having cross sills, a rear door, an operating shaft therefor disposed vertically to project below said door platform and having an arm on its projecting end, a rock shaft hanger mounted centrally on said chassis cross members, a vertically disposed rock shaft mounted on said hanger and provided with arms on its upper and lower ends, a link connecting the arm on the lower end of said rock shaft to said arm on said door shaft, a door operating lever disposed centrally of said vehicle at the right side of said driver's seat with the lower end of the lever projecting below the plane of said body cross sills, and a door operating rod having a downwardly bent front end disposed below the cross sill immediately at the rear of said door operating lever and connected to the lower end of said lever, there being a plurality of the body sills between said rock shaft and door operating lever having openings therein in which said operating rod is reciprocatingly supported.

3. In a motor vehicle, the combination of a chassis provided with cross members adjacent its rear end, a passenger body mounted on said chassis and having a driver's seat disposed at the front thereof and at the left of its longitudinal center, said body having a rear side door platform disposed in a plane below the plane of said chassis cross members, a rear door, an operating shaft therefor disposed vertically to project below said door platform and having an arm on its projecting end, a rock shaft hanger, a vertically disposed rock shaft mounted on said hanger and provided with a pair of arms, a link connecting one arm on the lower end of said rock shaft to said arm on said door shaft, a door operating lever disposed centrally of said vehicle at the right side of said driver's seat, and a door operating rod connected to the other arm of said rock shaft and to said door operating lever.

4. In a vehicle of the class described, the combination of a passenger body provided with a rear door and having cross sills, an operating shaft for said rear door provided with an arm, a rock shaft mounted centrally of the body and provided with a pair of arms, a link connecting one arm of said rock shaft to said arm on said operating shaft, a door operating lever at the front of said vehicle with its lower end projecting below the plane of said body cross sills, a door operating rod having a downwardly bent front end disposed below the cross sill immediately at the rear of said door operating lever and connected to the lower end thereof, there being a plurality of the body sills between said rock shaft and door operating lever having openings therein in which said operating rod is reciprocatingly supported, the openings in said sills adjacent said rock shaft being horizontally elongated to permit limited lateral movement of the rod, a pair of grooved supporting rollers for said actuating rod mounted on the front sill through which the rod is arranged, and a second pair of spool-like supporting rollers mounted on one of the rear sills having the elongated opening therein to support said rod and permit limited lateral swinging of the rear end thereof.

5. In a vehicle of the class described, the combination of a passenger body provided with a rear door and with cross sills having openings therethrough, an operating shaft for said rear door provided with an arm, a rock shaft mounted centrally of said body and provided with a pair of arms, a link connecting one of said arms on said rock shaft to said door operating shaft, a door operating lever at the front end of said vehicle, a door operating rod reciprocatingly mounted in said openings in said cross sills and connected to said lever and to the other arm of said rock shaft, the opening in a sill adjacent the rock shaft being elongated, and a pair of spool-like supporting rollers mounted on said sill and having the elongated opening to support said rod and permit limited lateral swinging thereof.

6. In a vehicle of the class described, the combination of a passenger body provided with a rear door and with a cross sill having an opening therethrough, an operating shaft for said rear door provided with an arm, a rock shaft mounted centrally of said body and provided with a pair of arms, a link connecting one of said arms on said rock shaft to said door operating shaft, a door operating lever at the front end of said vehicle, a door operating rod reciprocatingly mounted in said opening in said cross sill and connected to said lever and to the other arm of said rock shaft, and a pair of supporting rollers mounted on said sill and to support said rod.

7. In a vehicle of the class described, the combination of a passenger body provided with a rear door and with cross sills having openings therethrough, a door operating lever at the front end of said vehicle, a door operating rod operatively connected to said door and reciprocatingly mounted in said openings in said cross sills and connecting said lever, the opening in a sill adjacent the rock shaft being elongated, and a pair of spool-like supporting rollers mounted on said sill and having the elongated opening to support said rod and permit limited lateral swinging thereof.

In witness whereof I have hereunto set my hand.

HARRY A. FITZJOHN.